(12) United States Patent
Watanabe et al.

(10) Patent No.: US 6,656,080 B2
(45) Date of Patent: Dec. 2, 2003

(54) COOLING AND LUBRICATING MECHANISM OF TOROIDAL CONTINUOUSLY VARIABLE TRANSMISSION

(75) Inventors: Jun Watanabe, Yokohama (JP); Haruhito Mori, Yokohama (JP); Eio Sagara, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 59 days.

(21) Appl. No.: 09/961,444

(22) Filed: Sep. 25, 2001

(65) Prior Publication Data

US 2002/0049113 A1 Apr. 25, 2002

(30) Foreign Application Priority Data

Oct. 25, 2000 (JP) ........................................ 2000-325190

(51) Int. Cl.[7] .............................................. F16H 15/38
(52) U.S. Cl. ............................................. 476/8; 476/42
(58) Field of Search ................................. 476/8, 40, 42

(56) References Cited

U.S. PATENT DOCUMENTS

| | | | |
|---|---|---|---|
| 2,847,861 A | * | 8/1958 | Weisel .......................... 476/2 |
| 2,871,714 A | * | 2/1959 | Weisel .......................... 476/8 |
| 6,074,324 A | * | 6/2000 | Ishikawa et al. .............. 476/42 |
| 6,113,513 A | * | 9/2000 | Itoh et al. ..................... 476/10 |

FOREIGN PATENT DOCUMENTS

| | | |
|---|---|---|
| EP | 0 466 113 A1 | 1/1992 |
| GB | 784296 A | 10/1957 |
| JP | 10-231909 A | 9/1998 |
| JP | 11-63139 | 3/1999 |
| JP | 11-257451 A | 9/1999 |
| JP | 2000-193070 A | 7/2000 |

* cited by examiner

*Primary Examiner*—William C Joyce
(74) *Attorney, Agent, or Firm*—Foley & Lardner

(57) ABSTRACT

Plural cooling passages extending radially are formed from the inner circumference to the outer circumference and within an output disk common to two toroidal transmission units. Lubricating oil which has reached an annular space between the output disk and the main shaft via holes from an oil passage in the main shaft, flows into the cooling passages inside the output disk, and the output disk is thereby cooled from inside.

4 Claims, 8 Drawing Sheets

COOLING AND LUBRICATING MECHANISM OF TOROIDAL CONTINUOUSLY VARIABLE TRANSMISSION

FIELD OF THE INVENTION

This invention relates to cooling and lubricating of an output disk of a toroidal continuously variable transmission and its periphery.

BACKGROUND OF THE INVENTION

A toroidal continuously variable transmission (T-CVT) disclosed in JP-A-H11-63139 published by the Japanese Patent Office in 1999 discloses a toroidal transmission unit comprising an input disk and an output disk disposed coaxially, and power rollers which transmit power between the input disk and output disk. The T-CVT is often a double cavity type wherein two toroidal transmission units are disposed coaxially, so that power transmission capacity is doubled and so that the thrust forces cancel out as internal forces and do not act on the transmission case when the power rollers are gripped between the input disk and output disk.

In such a double cavity T-CVT, the input disks of both toroidal transmission units are disposed at some distance away from each other on a main shaft, and they rotate together with this main shaft. The output disk common to the input disks is rotatable relative to the main shaft between the input disks, and the power rollers are gripped between the input disks and output disk so that power is transmitted between the input disks and output disk.

By forming the output disks of the two toroidal transmission units in one piece, the axial length of the T-CVT can be shortened. The rotation from the engine is transmitted to the input disks via loading cams and transmitted to the common output disk from the input disks via the power rollers, and power is extracted from disk gears provided on the outer circumference of the output disk.

SUMMARY OF THE INVENTION

When the output disks of the two toroidal transmission units are formed in one piece as described above, for the cooling of the output disk, lubricating oil is supplied between the main shaft and the output disk from an oil passage in the main shaft through holes formed in a radial direction, and it flows out from both sides of the output disk. However, in this case, the lubricating oil is not discharged smoothly, so the heat exchange efficiency is low, the cooling of the output disk being particularly inadequate within the disk itself.

If the cooling of the output disk is inadequate, the temperature of the oil between the disk and the power rollers rises and a traction coefficient decreases, so not only does the torque transmission capacity decline, but durability is also impaired.

It is therefore an object of this invention to efficiently cool the common output disk of the two toroidal transmission units. It is a further object to efficiently lubricate bearings which support the output disk, and gears which transmit power from the output disk.

In order to achieve above object, this invention provides a continuously variable transmission, comprising a main shaft comprising a lubricating oil passage formed inside thereof, a pair of input disks provided on the main shaft, and rotating together with the main shaft, an output disk being common to the input disks and disposed between the input disks rotatably fitted on the main shaft, and power rollers gripped between the input disks and the output disk. A cooling passage is formed in the output disk, extending from the inner circumference to the outer circumference of the output disk, and lubricating oil in the lubricating oil passage is supplied to the cooling passage via a gap between the main shaft and the output disk.

The details as well as other features and advantages of this invention are set forth in the remainder of the specification and are shown in the accompanying drawings.

DESCRIPTION OF THE PREFERRED EMBODIMENTS

Referring to FIGS. 1–4 of the drawings, FIGS. 1–4 show an infinitely variable transmission (hereafter, IVT) for front wheel drive vehicles comprising a toroidal continuously variable transmission mechanism (T-CVT) according to this invention.

Figure 1:
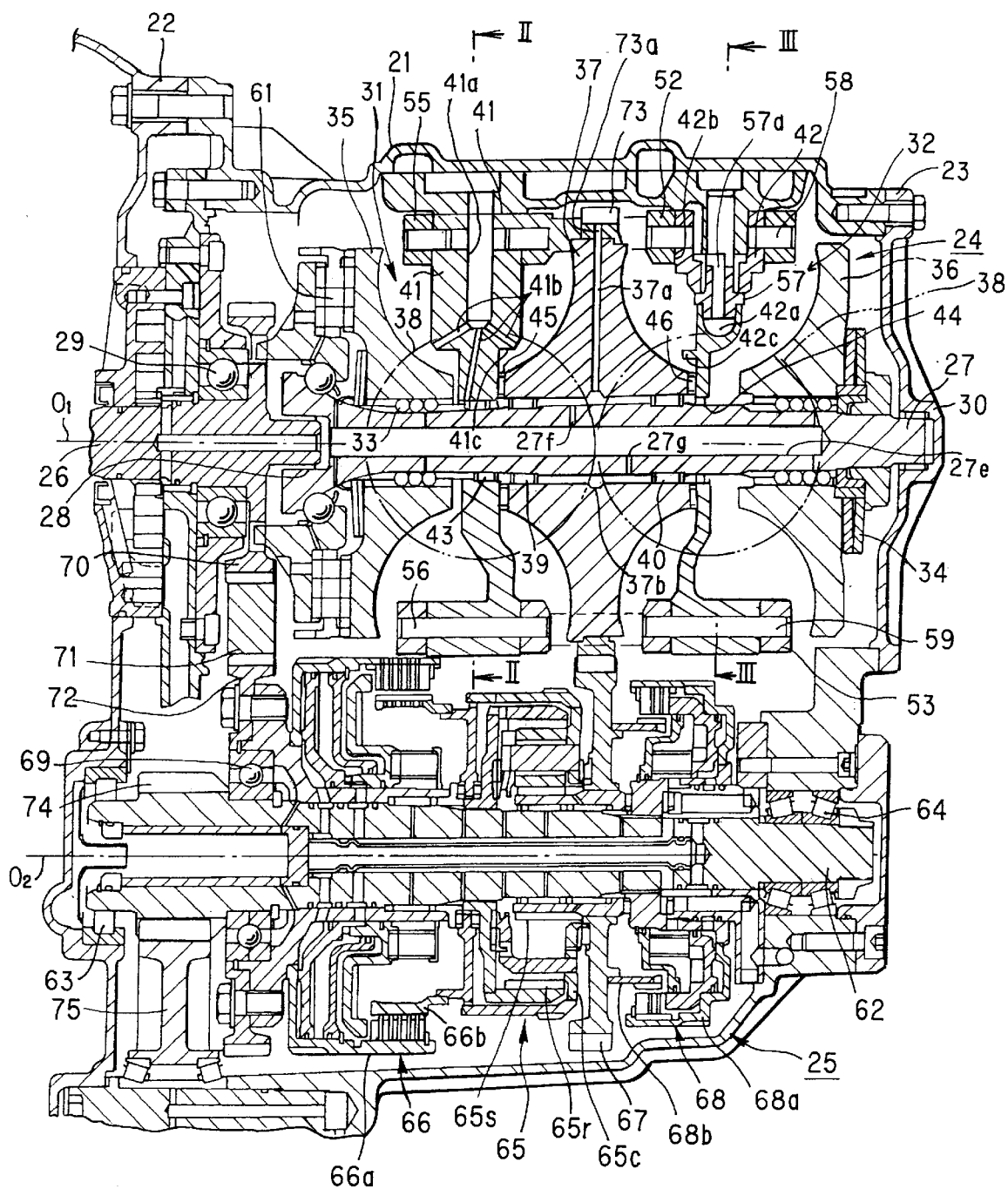
FIG. 1 is a cross-sectional view of an infinitely variable transmission with a toroidal continuously variable transmission mechanism according to this invention.

As shown in FIG. 1, a parallel first axis $O_1$ and second axis $O_2$ are set in a transmission case 21 comprising a front cover 22 and rear cover 23 which respectively close a front opening and a rear opening. A double cavity T-CVT 24 is installed on the first axis $O_1$, and an output control mechanism 25 is provided on the second axis $O_2$.

An input shaft 26 and main shaft 27 are disposed adjacent to each other on the first axis $O_1$. These shafts 26, 27 fit together so that they can rotate relative to each other via a radial bearing 28 provided between them. The input shaft 26 is supported via a bearing 29 in the transmission case 21, and the main shaft 27 is supported on the rear cover 23 via a bearing 30. The input shaft 26 is connected to an engine crankshaft via a torsional damper, not shown.

The T-CVT 24 comprises a front toroidal transmission unit 31 and a rear toroidal transmission unit 32.

The toroidal transmission units 31, 32 respectively comprise input disks 35, 36 which fit to the main shaft 27 in the vicinity of both ends via ball splines 33, 34 so that they are free to slide in an axial direction and rotate together with it, a common output disk 37 supported rotatably on the main shaft 27 between these input disks 35, 36, and power rollers 38 which transmit power between the input disks 35, 36 and output disk 37.

First radial bearings 39, 40 are interposed between the inner circumference of the common output disk 37 and the main shaft 27 respectively at each end of the output disk 37.

Figure 2:
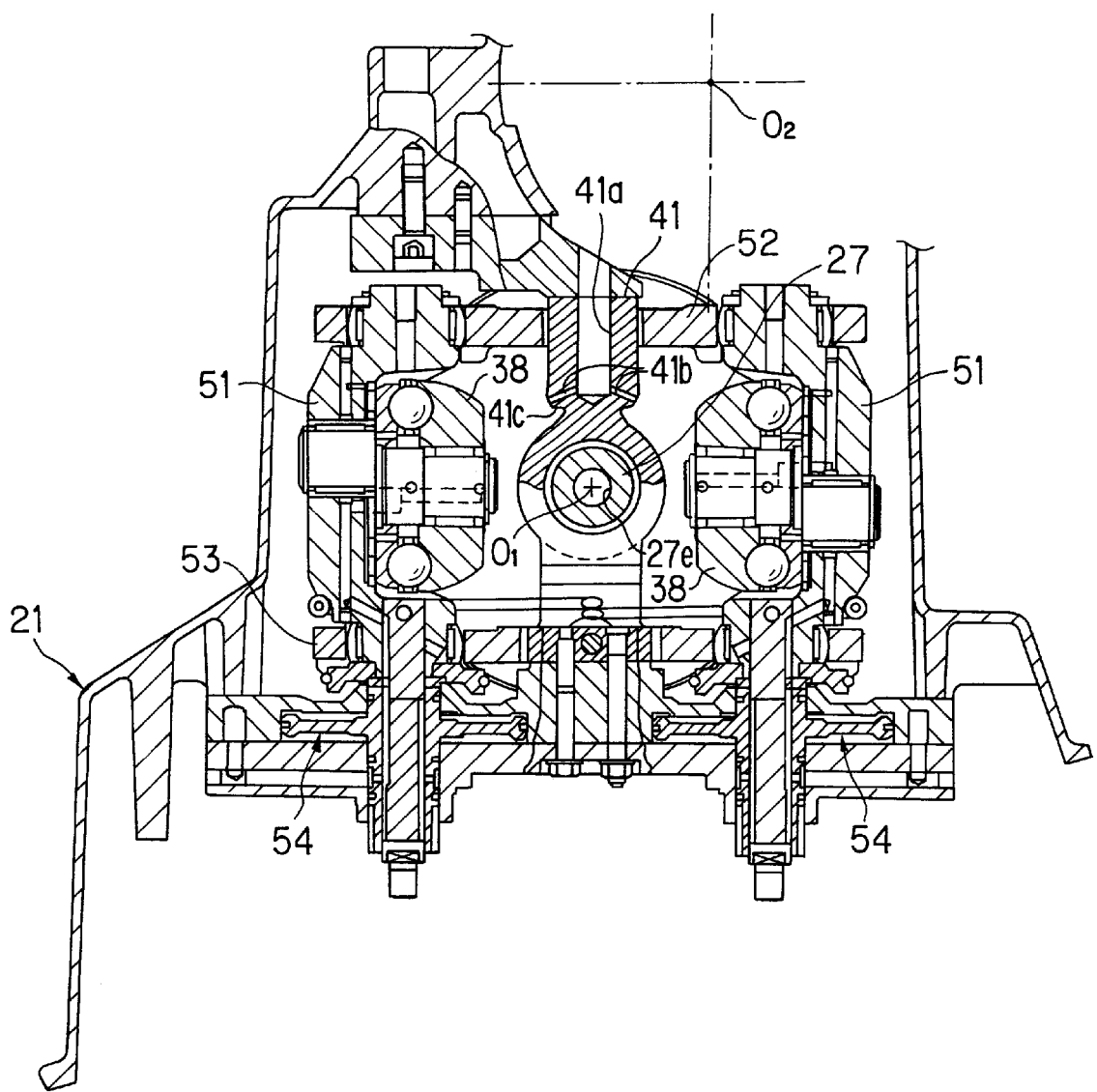
FIG. 2 is a sectional view through II—II in FIG. 1.
Figure 3:
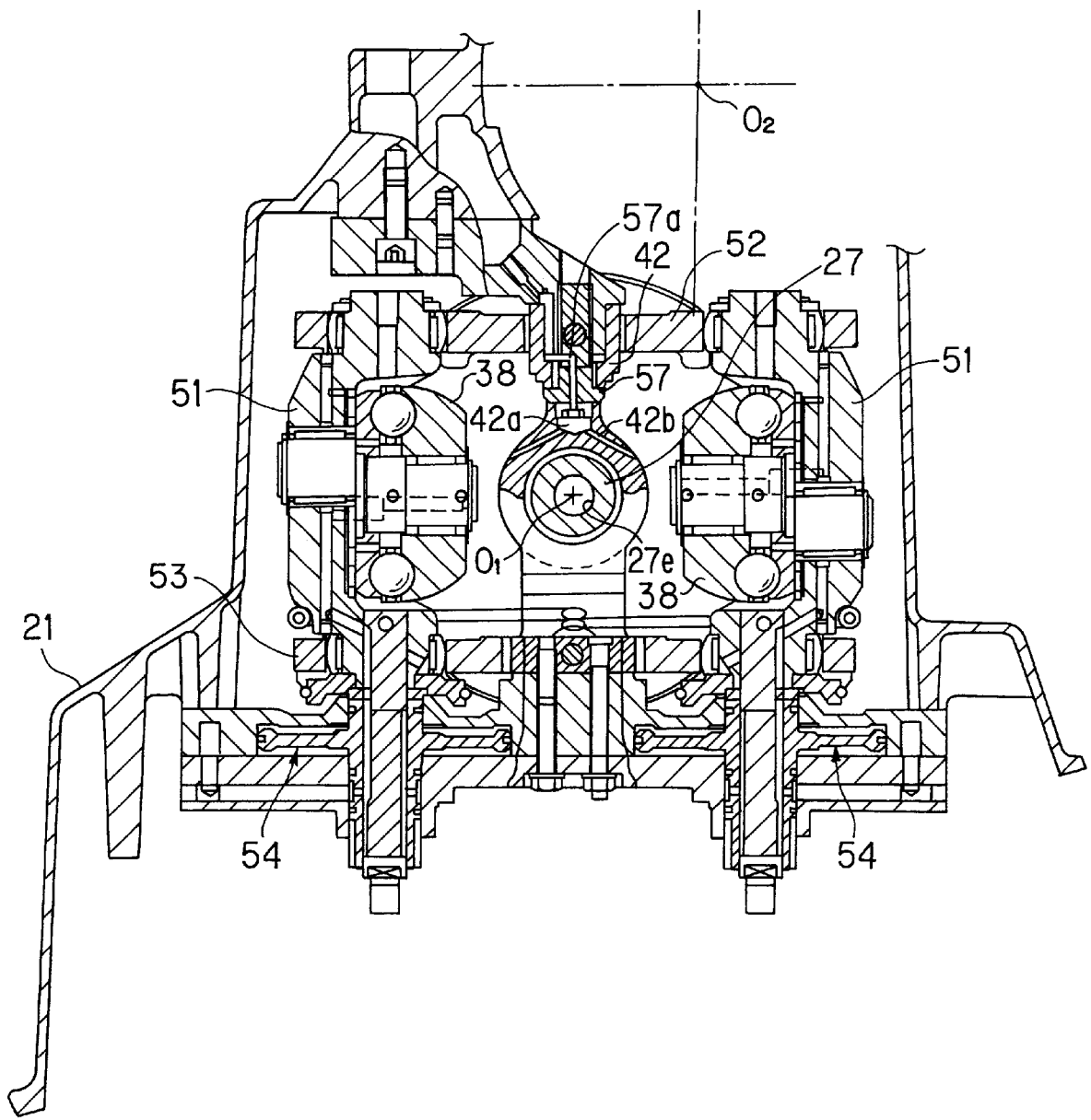
FIG. 3 is a sectional view through III—III in FIG. 1.

Positioning members 41, 42 are disposed at both sides of the output disk 37, as shown in FIGS. 1–3. The upper ends (upper part of FIGS. 1 to 3) and lower ends (lower part of FIGS. 1 to 3) of the positioning members 41, 42 are attached to the transmission case 21, and engage with the main shaft 27 substantially in the center between the upper end and lower end, thereby restricting the axial displacement of the output disk 37. Second radial bearings 43, 44 are disposed between the positioning members 41, 42 and main shaft 27 as shown in FIG. 4, and thrust bearings 45, 46 are interposed between the two end faces of the output disk 37 and the positioning members 41, 42.

Figure 4:
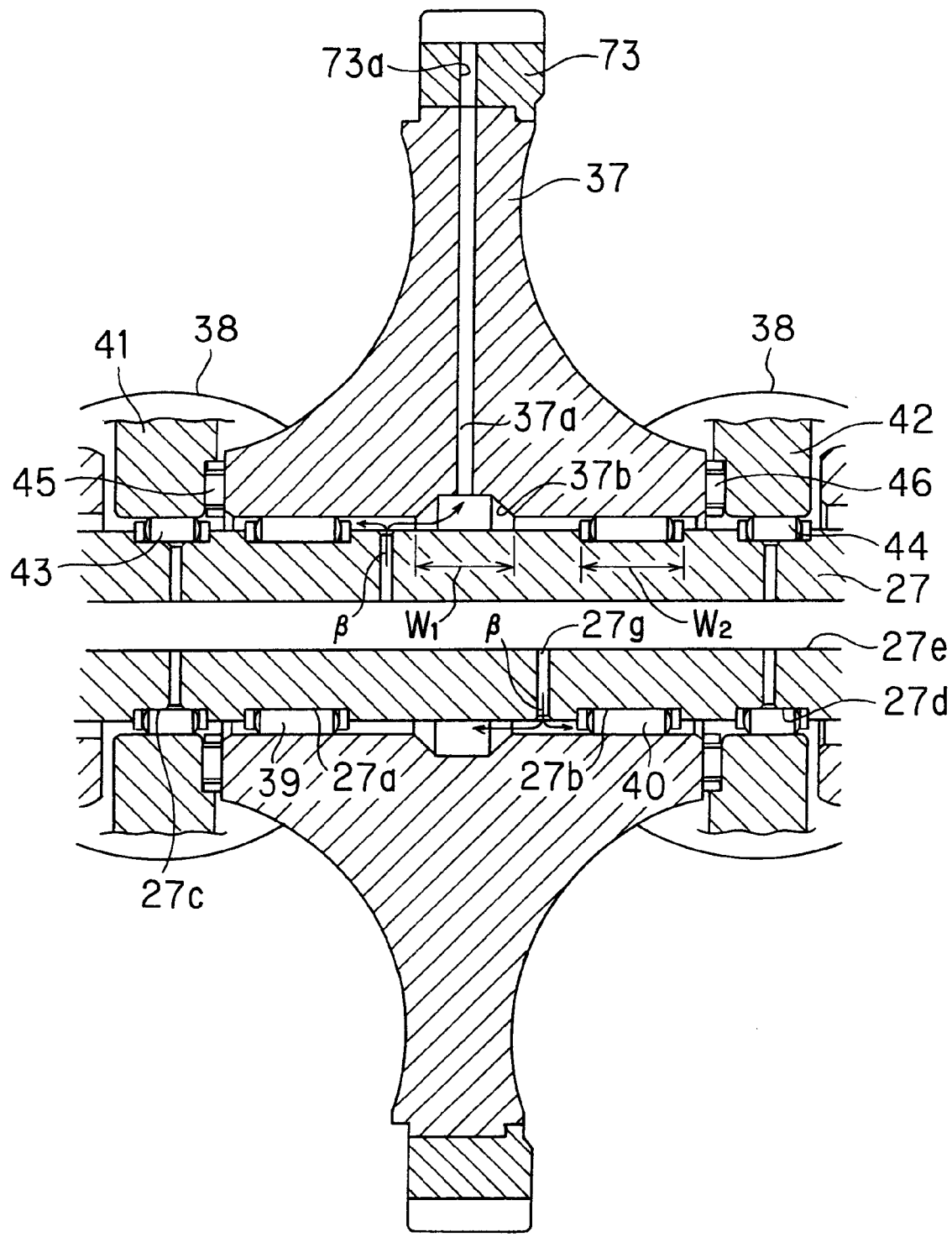
FIG. 4 is an enlarged cross-sectional view of an output disk of the toroidal continuously variable transmission mechanism.
Figure 5:
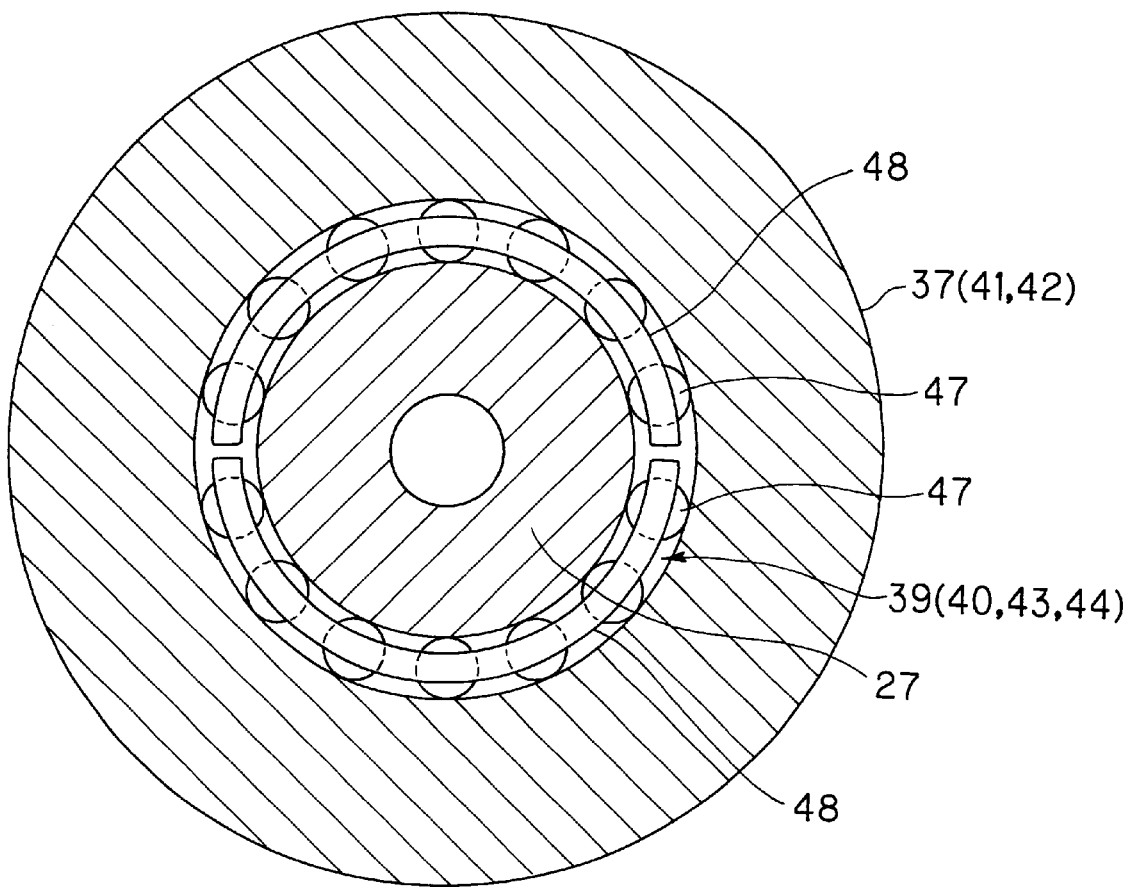
FIG. 5 is a cross-sectional view of a radial bearing supporting the output disk.

The first radial bearings 39, 40 and second radial bearings 43, 44 are respectively needle bearings as shown in FIG. 4, and are positioned by installing in outer circumferential grooves 27a–27d of the main shaft 27. To make such an installation possible, the first radial bearings 39, 40 and second radial bearings 43, 44 both comprise a sectional cage 48 supporting needle rollers 47 comprising plural arc-shaped members, and are separable into for example two parts in a radial direction.

Two power rollers 38 are provided for each toroidal transmission unit 31, 32, as shown in FIG. 2, FIG. 3, and are disposed facing each other on both sides of the main shaft 27. The power rollers 38 are supported rotatably on trunnions 51. The upper ends of the trunnions 51 close to the roof wall of the transmission case 21 are respectively connected to the four corners of a plate-shaped upper link 52, and the lower ends on the opposite side are respectively connected to the four corners of a lower link 53. The links 52, 53 prevent the power rollers 38 from moving outside the space between the input disks 35, 36 and output disk 37 when they are gripped between the input disks 35, 36 and output disk 37, but permit displacement in the gyration axis direction of the trunnions 51.

To vary the speed ratio of the T-CVT 24 (toroidal transmission units 31, 32), the trunnions 51 must be displaced in the gyration axis direction. Therefore, servo pistons 54 are provided at the lower ends of trunnions 51 to displace the trunnions 51. The displacements of the trunnions 51 are controlled by an oil pressure from a control valve, not shown, which is attached underneath the transmission case 21.

As shown in FIG. 1, loading cams 61 are provided between the input shaft 26 and input disk 35. An engine crankshaft, not shown, is provided on the left-hand side of the input shaft 26. The engine rotation is transmitted to the input disk 35 from the input shaft 26 via the loading cam 61, and is further transmitted to the input disk 36 via the main shaft 27.

The engine rotation transmitted to the input disks 35, 36 (transmission input rotation) is transmitted to the common output disk 37 via the power rollers 38. This transmission is realized by the loading cam 61 generating a thrust force according to the transmission torque so that the power rollers 38 are gripped between the input disks 35, 36 and output disk 37.

In the above transmission, when the power rollers 38 are displaced from the non-speed change position shown in FIG. 2, FIG. 3 by the servopistons 54 in synchronism with identical phase in the gyration axis direction via the trunnions 51, and the power roller rotation axis is offset from the rotation axis $O_1$ of the disks 35, 36 and 37, the power rollers 38 gyrate in synchronism with identical phase around the gyration axis. Hence, the contact circle radius between the power rollers 38 and disks 35, 36 and 37 varies continuously, and the transmission ratio (speed ratio) between the input disks 35, 36 and output disk 37 varies continuously. When the speed ratio reaches a target value, the target speed ratio is maintained by returning the power rollers 38 to the initial offset zero position.

In the above transmission, the output disk 37 rotates in an opposite direction to the rotation direction of the main shaft 27, and as the relative rotation between the two is a considerably high speed rotation, the first radial bearings 39, 40 which support the output disk 37 on the main shaft 27 must be adequately lubricated. Therefore, to fill this need, the lubricating oil in the oil passage 27e is introduced to the annular space between the output disk 37 and main shaft 27 via radial holes 27f, 27g formed in the main shaft 27 between the first radial bearings 39, 40, and is supplied to the first radial bearings 39, 40.

Next, the cooling mechanism of the output disk 37 and lubricating mechanism of the toroidal transmission units 31, 32 will be described in detail.

First, the cooling mechanism of the output disk 37 will be described.

As shown in FIG. 1, FIG. 4, plural cooling passages 37a extending radially from the inner circumference to the outer circumference are formed preferentially in a circumferential direction at equidistant intervals, and lubricating oil which has reached the annular space between the output disk 37 and main shaft 27 from the oil passage 27e in the main shaft 27 via the radial holes 27f, 27g, is made to flow in the cooling passages 37a in the output disk 37. The plural cooling passages 37a are provided to enhance the cooling efficiency in this embodiment, but the cooling effect may be obtained if there is at least one of the cooling passages 37a.

A groove 37b is formed in the center in the axial direction of the inner circumference of the output disk 37, the inner side of the cooling passages 37a in the radial direction opening onto this groove 37b. The radial holes 27f, 27g for supplying lubricating oil from the oil passage 27e in the main shaft 27 to the annular space between the main shaft 27 and output disk 37, open onto both sides in the width direction of the groove 37b. Further, a width $W_1$ of the groove 37b is made smaller than a width $W_2$ of the first radial bearings 39, 40.

By providing the cooling passages 37a in the output disk 37, making the lubricating oil in the annular space between the main shaft 27 and output disk 37, flow through the cooling passages 37a in the output disk 37, and as the lubricating oil passes rapidly through the cooling passages 37a due to the centrifugal force resulting from rotation of the output disk 37, the output disk 37 can be reliably cooled from inside.

In this way, temperature rise of the oil between the output disk 37 and power rollers 38 is suppressed, decrease in the traction coefficient is avoided, and decrease of torque transmission capacity and impairment of durability are prevented.

By providing the groove 37b in the inner circumference of the output disk 37, the heat exchange surface area is increased, and in addition, by arranging the openings of the inner ends of all the cooling passages 37a in the groove 37b, lubricating oil supplied in the annular space between the main shaft 27 and output disk 37 can be guided into the cooling passages efficiently. Further, the cooling passages 37a are made shorter by the depth of the groove 37b, so the flowpath resistance of the cooling passages 37a is decreased, lubricating oil is discharged more easily, and the output disk 37 can be even more reliably cooled.

By forming the holes 27f, 27g for supplying lubricating oil from the oil passage 27e in the main shaft 27 to the annular space between the main shaft 27 and output disk 37 on both sides of the groove 37b, lubricating oil which flows into the annular space from the holes 27f, 27g can be directed into the groove 37b and the cooling passages 37a, as shown by β in FIG. 4. Hence, not only is the aforesaid cooling effect of the output disk 37 ensured, but lubrication of the first radial bearings 39, 40 which support the output disk 37 can also be reliably performed.

By using separable radial bearings 39, 40 and installing them into the outer circumferential grooves 27a, 27b of the main shaft 27, the outer diameter of the output disk 37 is reduced by the depth of the outer circumferential grooves 27a, 27b, and the radial dimensions of the T-CVT 24 can be reduced.

The T-CVT 24 is assembled by fitting the output disk 37 to the main shaft 27 after the first radial bearings 39, 40 are installed in the outer circumferential grooves 27a, 27. As the width $W_1$ of the groove 37b is less than the width $W_2$ of the radial bearings 39, 40, the separable radial bearings 39, 40 do not fall out of the outer circumferential grooves 27a, 27b of the main shaft 27 into the groove 37b of the output disk 37 when the T-CVT 24 is assembled, and efficiency of assembly is not compromised.

Next, the lubricating mechanism of the front toroidal transmission unit 31 will be described.

An oil reservoir 41a is formed in the positioning member 41 shown in FIG. 1 and FIG. 2, and lubricating oil is supplied from the upper part of the transmission case 21 to the oil reservoir 41a. Holes 41b are further provided in the positioning member 41 for making lubricating oil in the oil reservoir 41a flow out towards the contact surface between the disks 35, 37 and the power rollers 38, the second radial bearing 43 and the power rollers 38. Thus, the contact surface between the disks 35, 37 and power rollers 38, the second radial bearing 43 and power rollers 38 are lubricated by the lubricating oil which flows out from the hole 41b.

If lubricating oil is supplied via the holes 41b in the positioning member 41 in this manner, there is a high degree of freedom regarding the position of the holes 41b, so by providing the holes 41b at a suitable position, lubricating oil can be directly and reliably supplied to any desired location.

The positioning member 41 may be used also as a link post which supports the upper link 52 and lower link 53 in the transmission case 21, and the upper link 52 and lower link 53 supported free to pivot on pins 55, 56. If the positioning member 41 is formed in one piece with the link post, the number of component parts can be reduced, and the rigidity of the positioning member 41 can be increased.

By providing a step 41c in the positioning member 41, and having the holes 41b open onto corners of the step 41c, lubricating oil flowing to the outside in a radial direction through the thrust bearing 45 is stopped by the step 41c, i.e., the step 41c functions as a partition. Therefore, this lubricating oil does not interfere with the lubricating oil which flows out from the holes 41b towards the contact surface between the disks 35, 37 and power rollers 38.

The step 41c also makes the lubricating oil flowing out in a radial direction through the thrust bearing 45, flow toward the contact surface between the output disk 37 and power rollers 38, and thereby still more reliably lubricate the contact surface between the output disk 37 and power rollers 38.

Figure 6:
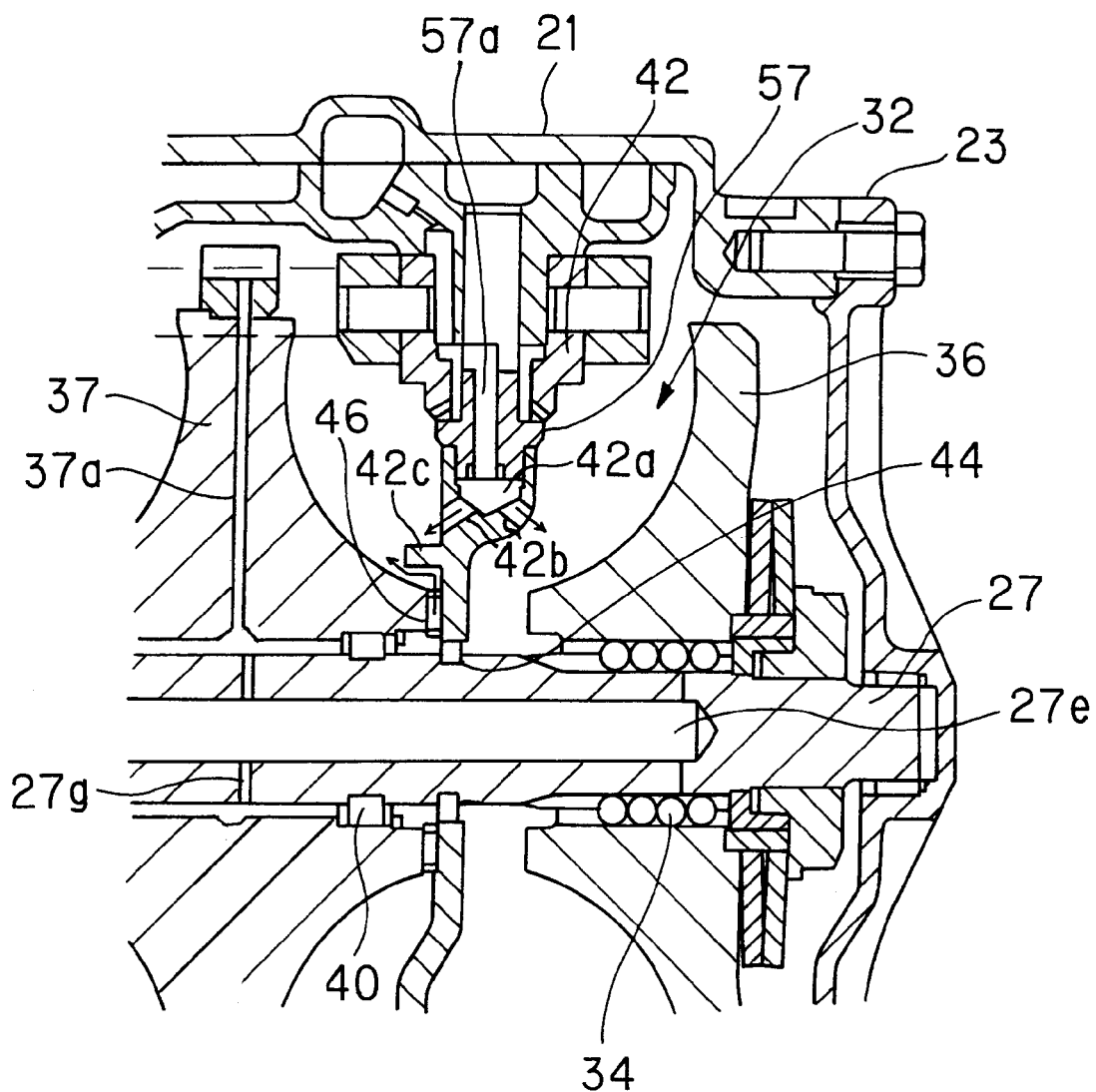
FIG. 6 is a detailed cross-sectional view of a front toroidal transmission unit.

In the rear toroidal transmission unit, an oil reservoir 42a is formed in the positioning member 42 as shown in FIG. 1, FIG. 3 and FIG. 6, and lubricating oil is supplied from the upper part of the transmission case 21 to the oil reservoir 42a. A connecting passage 57a is formed in a bolt 57 for attaching the positioning member 42 to the transmission case 21, and lubricating oil is supplied to the reservoir 42a from the upper part of the transmission case 21 via the connecting passage 57a. Holes 42b are further provided in the positioning member 42 to make lubricating oil in the oil reservoir 42a flow out toward the contact surface between the disks 36, 37 and power rollers 38, and the power rollers 38, in order to lubricate the contact surface between the disks 36, 37 and power rollers 38, and the power rollers 38, with lubricating oil supplied from the holes 42b.

When lubricating oil is supplied via the holes 42b in the positioning member 42, there is a high degree of freedom regarding the installation position of the holes 42b, so by providing the holes 42b in a suitable position, lubricating oil can be directly and reliably supplied to a desired location.

The positioning member 42 is also used as a link post which supports the upper link 52 and lower link 53 in the transmission case 21, so the upper link 52 and lower link 53 are supported free to pivot on pins 58, 59. If the positioning member 42 is formed in one piece with the link post, the number of component parts can be reduced, and the rigidity of the positioning member 42 can be enhanced.

By providing a partition 42c which extends toward the output disk 37 on the positioning member 42, and situating it between the holes 42b and thrust bearing 46, lubricating oil which flows out in a radial direction through the thrust bearing 46 is stopped by the partition 42c, so this lubricating oil does not interfere with the lubricating oil flowing from this holes 42b towards the contact surface between the disks 36, 37 and power rollers 38.

The partition 42c also causes lubricating oil which flowed out in a radial direction through the thrust bearing 46, to flow toward the contact surface between the output disk 37 and power roller 38, so that lubrication of these parts is still more reliable.

Next, the output control mechanism 25 will be described referring to FIG. 1.

The output control mechanism 25 is provided on an auxiliary shaft 62 disposed on the second axis $O_2$. The two ends of the auxiliary shaft 62 are respectively supported on the front cover 22 and transmission case 21 via bearings 63, 64. A planetary gear set 65, a power circulation clutch 66 disposed on the side of the planetary gear set 65 near the engine, an output gear 67 and a direct clutch 68 disposed on the other side of the planetary gear set 65 far from the engine, are provided on the auxiliary shaft 62.

The planetary gear set 65 comprises a sun gear 65s, carrier 65c and ring gear 65r. The sun gear 65s engages with the output disk 37 of the T-CVT 24 as described later. In the power recirculation mode, the transmission input rotation from the input shaft 26 is input to the carrier 65c as described later. The output rotation of the IVT is extracted from the ring gear 65r.

The power recirculation clutch 66 is provided to input the transmission input rotation from the input shaft 26 to the carrier 65c. For this purpose, a clutch drum 66a is supported on the auxiliary shaft 62 via a bearing 69, and the rotation of the input shaft 26 is input via a power recirculation gear train comprising a gear 70 formed on the input shaft 26, idler gear 71 and power circulation gear 72 connected to the clutch drum 66a. A clutch hub 66c is connected to the carrier 65c.

The sun gear 65s is supported rotatably on the auxiliary shaft 62, and is fixed to the output gear 67. The output gear 67 engages with a disk gear 73 provided on the outer circumference of the output disk 37.

The ring gear 65r engages with the auxiliary shaft 62 by serration, the rotation from the ring gear 65r to the auxiliary shaft 62 being extracted via a gear set comprising a pinion 74 formed in one piece with the auxiliary shaft 62, and an idler gear 75 which engages with it.

The direct clutch 68 is provided to transmit the output rotation of the T-CVT 24 to the auxiliary shaft 62 as it is, and extract it via the gear set comprising the pinion 74 and idler gear 75. Therefore, the clutch drum 68a of the clutch 68 engages with the auxiliary shaft 62 by serration, and the clutch hub 68b is fixed to the output gear 67.

The IVT is constructed by assembling the T-CVT 24 and output control mechanism 25, and functions as follows.

When the clutch 66 is engaged and the clutch 68 is released, the transmission input rotation to the main shaft 27 is transmitted to the carrier 65c of the planetary gear set 65 via the power recirculation gear train 70–72 and clutch 66. The rotation transmitted to the carrier 65c is distributed between the sun gear 65s and ring gear 65r, the rotation reaching the sun gear 65s is recirculated to the toroidal transmission units 31, 32 via the output gear 67 and disk gear 73, and the rotation reaching the ring gear 65r is extracted from the auxiliary shaft 62 and gear sets 74, 75 (power recirculation mode).

In this power recirculation mode, when the speed ratio of the T-CVT 24 is adjusted to a predetermined ratio where the rotation of the carrier 65c is zero, the output rotation transmitted to the auxiliary shaft 62 and gear sets 74, 75 is zero, and the state where the speed ratio (transmission input rotation speed/transmission output rotation speed) is infinite (geared neutral point), can be realized while the transmission path is mechanically engaged.

At a smaller speed ratio than the predetermined ratio, the output rotation to the auxiliary shaft 62 and gear sets 74, 75 is reversed, and the output rotation to the auxiliary shaft 62 and gear sets 74, 75 increases the rotation speed in the forward direction, the larger the speed ratio of the T-CVT 24 is compared to the predetermined ratio. Therefore, in the power recirculation mode, when the speed ratio of the T-CVT 24 reaches this speed ratio, the output rotation to the auxiliary shaft 62 and gear sets 74, 75 (rotation speed of clutch drum 68a) coincides with the rotation transmitted from the sun gear 65s to the clutch hub 68b. By engaging the clutch 68 at this revolution synchronization point (RSP) and releasing the clutch 66 simultaneously, there is a changeover to the direct mode wherein the rotation from the T-CVT 24 is directly output to the auxiliary shaft 62 and gear sets 74, 75 via the clutch 68. In this direct mode, the speed change of only the T-CVT 24 is reflected in the speed change of the IVT.

Next, the lubrication mechanism of the disk gear 73 and the output gear 67 which is the opposite gear engaging with it, will be described referring to FIG. 1 and FIG. 4.

For the purpose of this lubrication, passages 73a extending in a radial direction are provided in the disk gear 73. The passages 73a communicate with the cooling passages 37a formed in the output disk 37. After the output disk 37 is cooled, lubricating oil is guided to the bottom of the disk gear 73 via the passages 73a, and the engaging part of the disk gear 73 and the output gear 67 is lubricated thereby.

Therefore, the lubrication of the engaging part the disk gear 73 and output gear 67 can be performed using lubricating oil after cooling the output disk 37, and there is no need to provide an additional lubrication mechanism for cooling.

Figure 7:
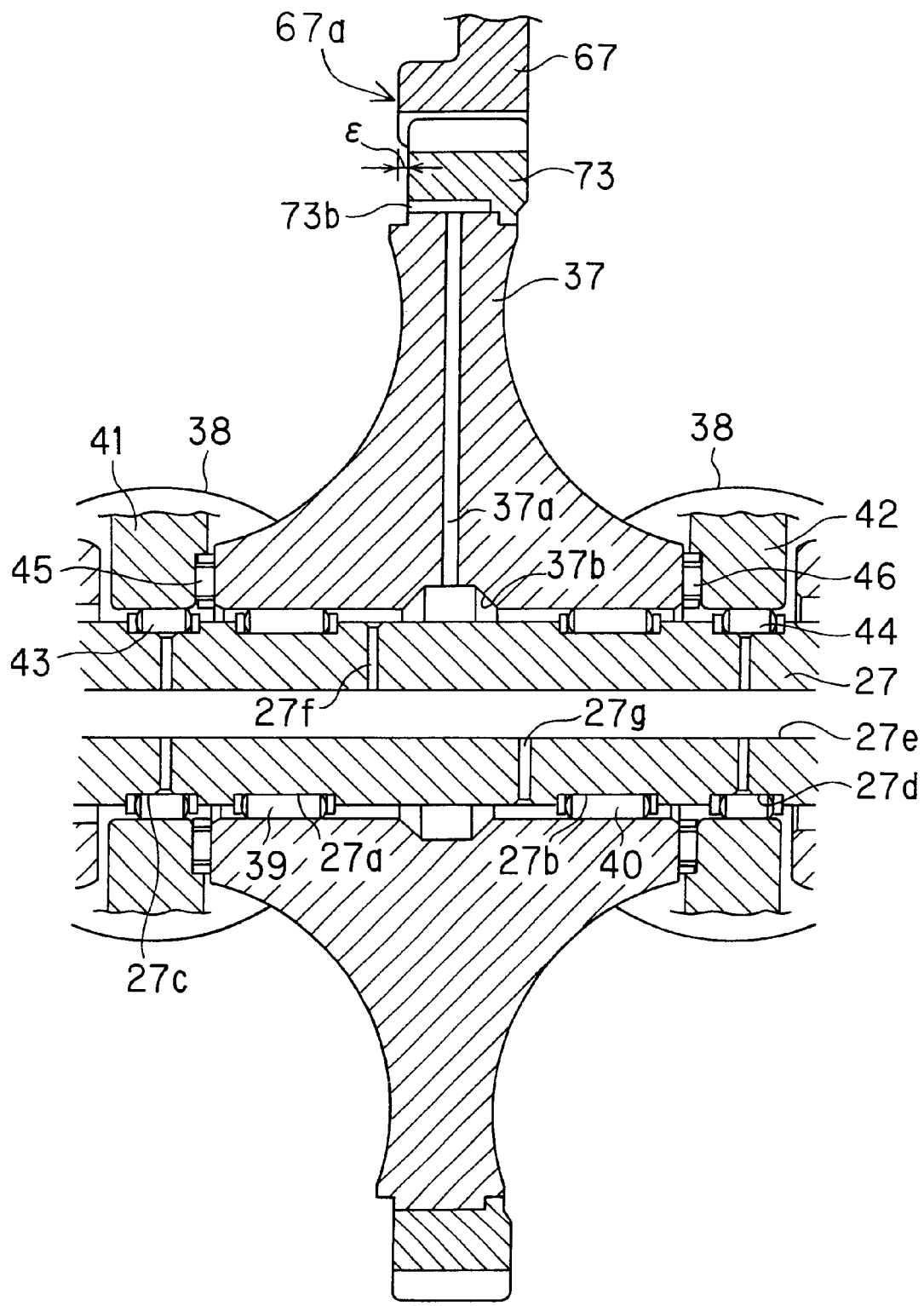
FIG. 7 is similar to FIG. 4, but showing a second embodiment of this invention.
Figure 8:
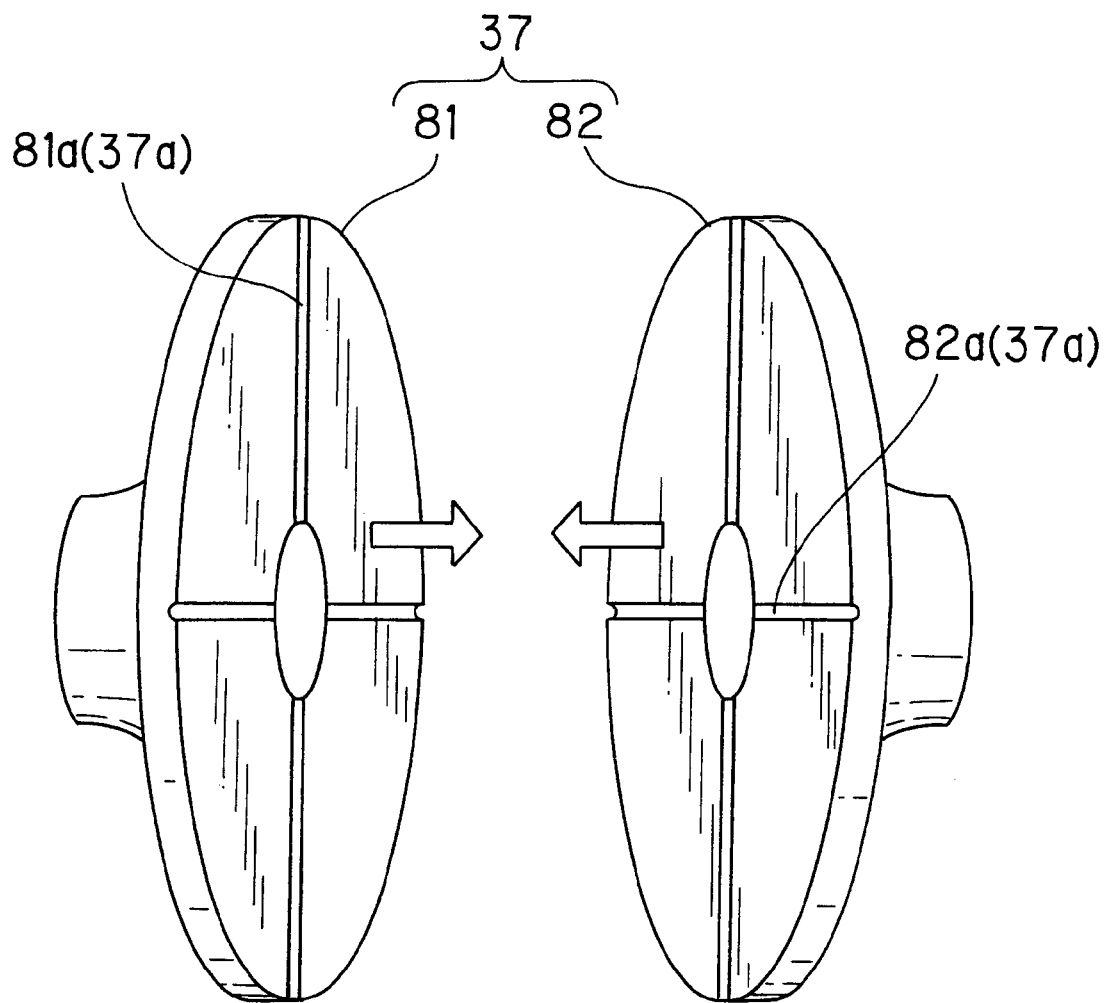
FIG. 8 shows a third embodiment of this invention, being a perspective view showing another construction of the output disk.

The lubricating mechanism of the disk gear 73 and output gear 67 may have the construction shown in FIG. 7. Specifically, the width of the output gear 67 is enlarged, and part of the output gear 67 is made to extend further in an axial direction than the disk gear 73, as shown by $\epsilon$ in the figure. Further, a slot 73b is formed in the inner circumference of the disk gear 73 which communicates with the outer end openings of the cooling passages 37a and opens in an axial direction so that lubricating oil from the cooling passages 37a flows out towards the axial extension part 67a of the disk gear 67.

In this case, lubricating oil after the output disk 37 is cooled passes through the slot 73b and is received by the axial extension part 67a, so the engaging part between the disk gear 73 and output gear 67 can be lubricated.

When the cooling passages 37a are formed in the output disk 37, the output disk 37 can be axially split into two in the axial direction, grooves 81a, 82a having a semicircular cross-section may be formed to form the cooling passages 37a, and the disk halves 81, 82 may be brought together so that the grooves 81a, 81b mutually overlap to form the output disk 37. In this way, the cooling passages 37a which are difficult to manufacture with a small diameter can be easily manufactured.

The entire contents of Japanese Patent Application P2000-325190 (filed Oct. 25, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A continuously variable transmission, comprising:
   a main shaft comprising a lubricating oil passage formed inside thereof;
   a pair of input disks provided on the main shaft, and rotating together with the main shaft;
   an output disk being common to the input disks and disposed between the input disks rotatably fitted on the main shaft; and
   power rollers gripped between the input disks and the output disk,
   wherein a cooling passage is formed in the output disk, extending from an inner circumference to an outer circumference of the output disk, and lubricating oil in the lubricating oil passage is supplied to the cooling passage via a gap between the main shaft and the output disk,
   wherein an inner circumferential groove is formed in the inner circumference of the output disk into which the cooling passage opens, and
   wherein the main shaft comprises holes which supply the lubricating oil to both sides, in a width direction, of the inner circumferential groove.

2. A continuously variable transmission, comprising:
   a main shaft comprising a lubricating oil passage formed inside thereof;
   a pair of input disks provided on the main shaft, and rotating together with the main shaft;
   an output disk being common to the input disks and disposed between the input disks rotatably fitted on the main shaft; and power rollers gripped between the input disks and the output disk, wherein a cooling passage is formed in the output disk, extending from an inner circumference to an outer circumference of the output disk, and lubricating oil in the lubricating oil passage is supplied to the cooling passage via a gap between the main shaft and the output disk, wherein an inner circumferential groove is formed in the inner circumference of the output disk into which the cooling passage opens, and wherein the transmission further comprises:
  a radial bearing which is separable in the radial direction and supports the output disk on the main shaft,
  wherein the radial bearing is installed in an outer circumferential groove formed on the outer circumference of the main shaft, and the width of the radial bearing is wider than the inner circumferential groove.

3. A continuously variable transmission, comprising:

a main shaft comprising a lubricating oil passage formed inside thereof;

a pair of input disks provided on the main shaft, and rotating together with the main shaft;

an output disk being common to the input disks and disposed between the input disks rotatably fitted on the main shaft; and power rollers gripped between the input disks and the output disk, wherein a cooling passage is formed in the output disk, extending from an inner circumference to an outer circumference of the output disk, and lubricating oil in the lubricating oil passage is supplied to the cooling passage via a gap between the main shaft and the output disk, wherein a disk gear for extracting power is provided on the outer circumference of the output disk, wherein a part of an opposite gear engaging with the disk gear extends further in an axial direction than the disk gear, and wherein lubricating oil which has flowed out from the cooling passage is received by the extension part of the opposite gear.

4. A continuously variable transmission, comprising:

a main shaft comprising a lubricating oil passage formed inside thereof a pair of input disks provided on the main shaft, and rotating together with the main shaft;

an output disk being common to the input disks and disposed between the input disks rotatably fitted on the main shaft; and power rollers gripped between the input disks and the output disk, wherein a cooling passage is formed in the output disk, extending from an inner circumference to an outer circumference of the output disk, wherein lubricating oil in the lubricating oil passage is supplied to the cooling passage via a gap between the main shaft and the output disk, and wherein the continuously variable transmission further comprises:
  a positioning member which positions the output disk in an axial direction,
  wherein lubricating oil is introduced into the positioning member, and
  wherein a hole is formed in the positioning member, and causes lubricating oil to flow toward the contact surface between the disks and power roller, and a partition is provided on the positioning member which stops lubricating oil flowing from between the main shaft and the output disk to between the output disk and the positioning member, and prevents a collision with lubricating oil which has flowed out from the hole.

* * * * *